(No Model.) 2 Sheets—Sheet 1.
R. H. DRAPER.
TEMPERATURE REGULATOR.

No. 413,775. Patented Oct. 29, 1889.

Witnesses
J. Jessen.
C. L. Nachtrieb.

Inventor.
Rufus H. Draper.
By Paul, Sanford & Merwin,
attys.

(No Model.)

R. H. DRAPER.
TEMPERATURE REGULATOR.

No. 413,775. Patented Oct. 29, 1889.

Witnesses.
J. Jensen.
C. L. Nachtrieb.

Inventor.
Rufus H. Draper.
By Paul, Sanford & Merwin Attys.

UNITED STATES PATENT OFFICE.

RUFUS H. DRAPER, OF MINNEAPOLIS, MINNESOTA.

TEMPERATURE-REGULATOR.

SPECIFICATION forming part of Letters Patent No. 413,775, dated October 29, 1889.

Application filed August 16, 1888. Serial No. 282,883. (No model.)

*To all whom it may concern:*

Be it known that I, RUFUS H. DRAPER, of Minneapolis, in the county of Hennepin and State of Minnesota, have invented certain Improvements in Temperature-Regulators, of which the following is a specification.

The object of my invention is to provide means for automatically controlling a steam-heating apparatus; and the invention consists, generally, in providing a steam-heating apparatus with an automatic regulator and with a pressure-diaphragm, both of which are arranged to operate upon a damper or door which controls the draft of the heater.

Figure 1:
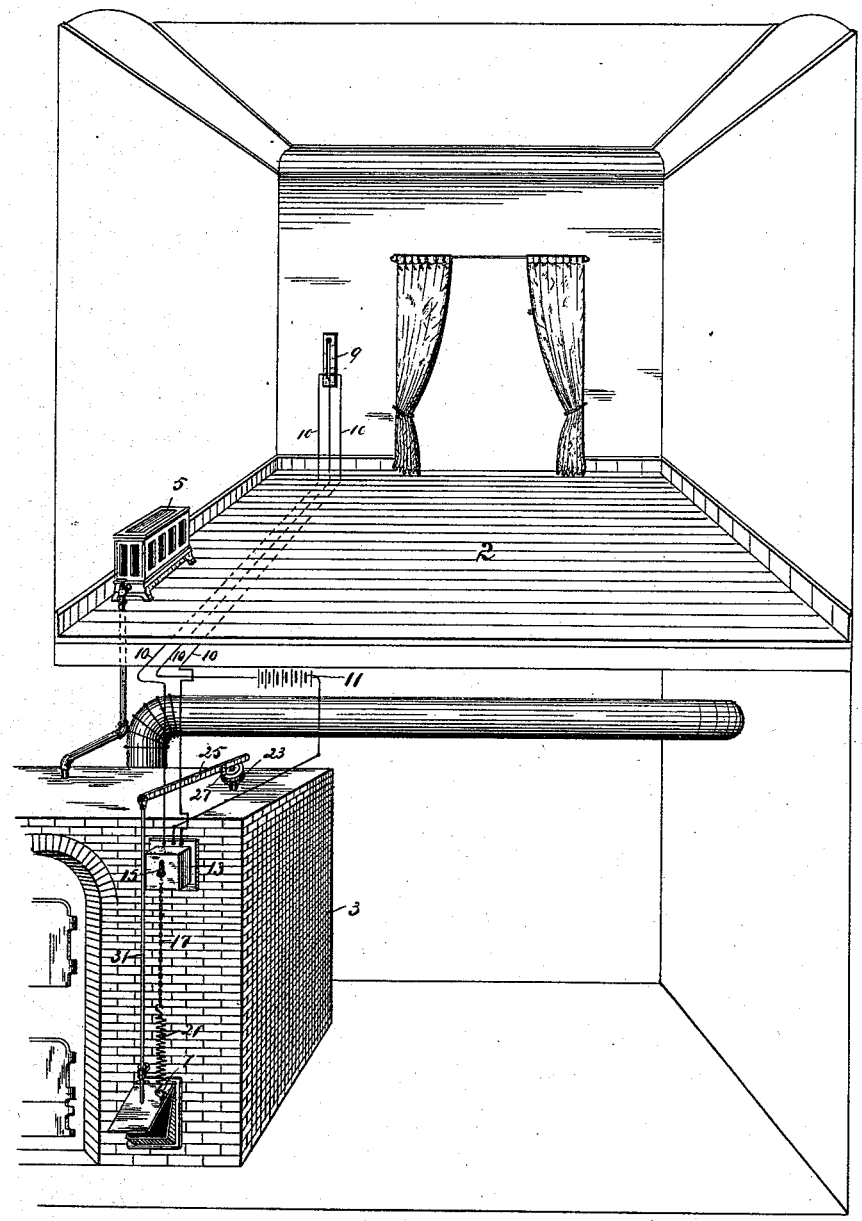
Figure 2:
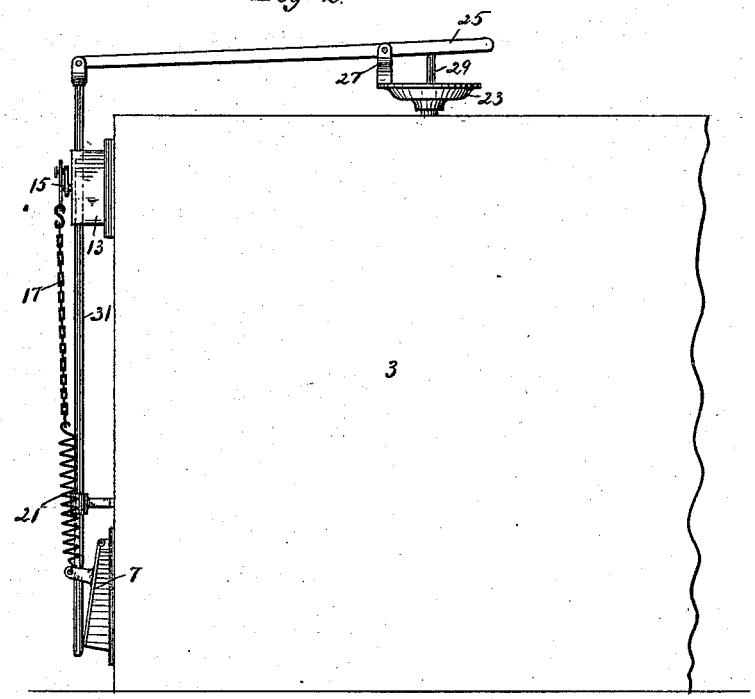
Figure 3:
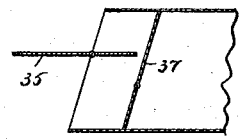
Figure 4:
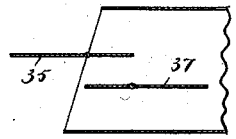
Figure 5:
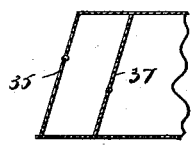

In the accompanying drawings, forming a part of this specification, Figure 1 is a perspective view of a portion of a steam-heating apparatus, showing the manner of applying my regulator thereto. Fig. 2 is a side elevation of a portion of the heater, showing the manner of connecting the pressure-diaphragm and the motor of the electric regulator with the damper. Figs. 3, 4, and 5 are details of a double damper, which may be used in place of a single damper shown in Figs. 1 and 2.

In the drawings, 2 represents a room or apartment which is to be heated.

3 represents a steam-heater of any suitable construction, and 5 represents a radiator of any suitable construction, preferably placed in the room to be heated, and connected by suitable steam-pipes with the boiler of the steam-heater. Instead, however, of using a radiator 5, the steam-heating apparatus may be one of those in which indirect radiation is employed. It is immaterial, so far as the purposes of my invention are concerned, which arrangement of radiators is used.

7 represents a damper through which the air for combustion is supplied to the heater. This damper may be of any suitable size and of any ordinary construction and arrangement.

9 represents a thermostat of an automatic electric heat-regulator—such, for example, as that shown and described in the application of A. M. Butz, now pending before the Patent Office, Serial No. 248,946. This thermostat is connected by electric wires 10 with a battery 11 and a suitable motor 13—such, for example, as that described in the application for patent hereinbefore referred to. The motor 13 is provided with a suitable crank 15, to which is connected a chain 17, which is connected with the damper 7. When the temperature rises above the desired degree in the room in which the thermostat is located, the motor is caused to start, a partial revolution is given to its crank-shaft, and the damper 7 is closed. When the temperature falls below the desired point, the motor is again started and opens the damper. It sometimes occurs, however, that the temperature of the room in which the thermostat is located will not rise to the desired degree until after an excessive pressure of steam is obtained in the boiler of the steam-heater. This is a serious inconvenience and danger, which I seek to avoid by the means described in this specification.

It will be seen that if excessive pressure of steam is obtained in the boiler while the room in which the thermostat is located is still below the normal temperature the draft-damper 7 will remain open and the fire continue to burn rapidly and the pressure of steam will be increased. If the pressure is raised to a point exceeding the gage of the safety-valve, that valve will be opened and steam and water will be blown out into the cellar or basement, where the heater may be located. To obviate this objection I provide means for closing the damper 7 whenever the pressure in the boiler reaches a predetermined limit. As shown in Figs. 1 and 2, a coil-spring 21 is arranged in the connection between the motor-crank 15 and the damper 7. This spring permits the damper to be closed while the crank 15 is in position to hold the damper open. The steam-heater is provided with an ordinary pressure-gage 23, having a lever 25 mounted upon a stationary fulcrum 27 and connected to the diaphragm of the pressure-gage by a rod 29. As the pressure of the steam increases the rod 29 is raised, and with it that end of the lever, while the end of the lever on the opposite side of the fulcrum is depressed. A rod 31, connected to the end of the lever 25, is arranged to slide in suitable guides above the damper 7. When the outer end of the lever 25 is depressed, the rod 31, sliding in guides, is brought against the upper surface of the damper 7 and causes the damper to close against the tension of the spring 21. It will be seen, therefore, that if the steam rises above the predetermined limit before the temperature of the room in which the thermostat is placed reaches the predetermined degree the steam-gage 23 will be operated and the damper 7 will be closed. The fire will thereby be sufficiently checked to cause the steam to fall, and as soon as this is done the rod 31 is moved away from the damper 7 and the damper is again under the control of the motor 13.

It will be understood that, if preferred, an ordinary check-damper may be arranged in the smoke-pipe, to open and close with the movement of the damper 7, whether that damper is operated by the motor or by the steam-pressure. Instead, however, of using a damper with a single flap, as shown in Figs. 1 and 2, and operating it both by means of the electrically-controlled motor and by the steam-gage, I may use a damper having two flaps, as shown in Figs. 3, 4, and 5, either of which will completely close the draft-opening. In this instance the steam-gage will be connected to the damper, which is always open except when the pressure of the steam is too high, while the electrically-controlled motor will be connected with the other flap of the damper.

In Figs. 3, 4, and 5, 35 represents the flap that is operated by the electrically-controlled motor, and 37 the flap that is operated by the steam-gage. At all times, except when the pressure of the steam is too high, the flap 37 remains wide open, as shown in Fig. 4, and the flap 35 opens and closes as the temperature of the room in which the thermostat is located rises and falls. Should, however, the pressure of the steam become too great, the flap 37 will be closed and the fire will be checked sufficiently to prevent an increase of pressure, even though the temperature of the room may not have reached the desired limit. As soon as the pressure of steam is decreased the flap 37 will open and the damper 35, operated by the electrically-controlled motor, will again assume control of the draft.

I claim as my invention—

1. The combination, with a steam-heating apparatus provided with a suitable draft-opening and a damper therefor, of a thermostatic regulator connected with said damper and controlled by a thermostat located in the room or apartment to be heated, and a pressure-lever arranged to be operated by the pressure of the steam and also connected with said damper, substantially as described.

2. The combination, with a steam-heating apparatus provided with a suitable draft-opening and a damper therefor, of a thermostatic regulator governed by the temperature of the room or apartment to be heated and connected with said damper by a suitable spring-connection, and a pressure-lever arranged to be operated by the pressure of steam in the boiler of the apparatus and connected with said damper and adapted to close the same against the tension of the spring-connection of the thermostatic regulator.

3. The combination, with a steam-heating apparatus provided with a suitable draft-opening, of a thermostatic regulator controlled by the temperature of the apartment to be heated and governing said draft-opening when the steam in the boiler is below the maximum pressure desired, and a pressure-lever arranged to close said draft-opening when the steam reaches the maximum pressure desired, and to hold the same closed independently of the thermostatic regulator so long as the steam remains above such pressure.

In testimony whereof I have hereunto set my hand this 11th day of August, 1888.

RUFUS H. DRAPER.

In presence of—
A. C. PAUL,
C. L. NACHTRIEB.